United States Patent [19]

Sands

[11] Patent Number: 5,613,739

[45] Date of Patent: Mar. 25, 1997

[54] WELDED CENTER WHEEL RIM

[75] Inventor: Perry W. Sands, Long Beach, Calif.

[73] Assignee: Performance Machine, Inc., Paramount, Calif.

[21] Appl. No.: 341,756

[22] Filed: Nov. 18, 1994

[51] Int. Cl.⁶ .................................................. B60B 23/00
[52] U.S. Cl. ........................ 301/63.1; 301/95; 29/894.322
[58] Field of Search .................................. 301/63.1, 64.2, 301/64.3, 95–98; 29/894, 894.32, 894.322

[56] References Cited

U.S. PATENT DOCUMENTS

| 1,613,127 | 1/1927 | Reyneri | 301/64.2 |
| 2,220,284 | 11/1940 | Roemer | 301/63.1 |
| 2,551,783 | 5/1951 | Ash | 301/63.1 |
| 4,286,825 | 9/1981 | Sieving | 301/63.1 |
| 4,522,268 | 6/1985 | Morris et al. | 301/64.3 X |

FOREIGN PATENT DOCUMENTS 1150537  4/1969  United Kingdom ................. 301/64.3

Primary Examiner—Russell D. Stormer
Attorney, Agent, or Firm—Richard L. Myers

[57] ABSTRACT

A wheel having an axis and being adapted for rotatably supporting a tire on a vehicle, includes a wheel center extending from a hub outwardly to a circumferential surface. A wheel rim disposed in contact with the circumferential surface of the wheel center can be formed as first and second rim portions which are coupled to form a drop center of the rim. A single continuous weld disposed within the drop center connects the rim to the wheel center. An associated method includes the step of forming an annular flange on the wheel center and positioning the rim portions in abutting relationship with the annular flange.

9 Claims, 4 Drawing Sheets

WELDED CENTER WHEEL RIM

BACKGROUND OF THE INVENTION

1. Field of the Invention

This invention relates to wheels adapted for use in supporting an associated tire in rotating relationship with a vehicle.

2. Discussion of the Prior Art

Wheels are commonly formed with a hub which is mountable in rotatable relationship with the axle of a vehicle. A wheel center extends radially outwardly of the hub and commonly includes a plurality of spokes which support a rim at the outer circumference of the wheel. A typical rim includes an inner annulus attached to the wheel center, and a pair of outer annuli. Together, the inner and outer annuli define a drop center of the wheel having an inwardly facing surface and an outwardly facing surface. The tire is mounted between the outer annuli on the outwardly facing surface of the drop center.

In the past, the rim has been attached to the wheel center by at least one weld which has been formed between the wheel center and the inwardly facing surface of the drop center. This configuration has not been objectionable for automobile tires where the wheel can be mounted with the weld facing inwardly of the automobile where it is not visible. However, this configuration has been intolerable for motorcycles where typically both sides of the wheel are visible.

In the case of motorcycle wheels, the rim has been provided with a pair of flanges extending inwardly of the inner annulus and spaced to receive the wheel center. Bolts extending through the flanges have attached the rim to the wheel center. This manufacturing process is costly in that additional structure is required along with additional components. Importantly, the time required to attach the numerous bolts to the wheel adds significantly to this cost of manufacture.

SUMMARY OF THE INVENTION

These disadvantages of the prior art are overcome with the present invention which includes a rim in the form of two half-rims each having an inner annulus and an outer annulus. The wheel center is provided with an annular flange which extends radially outwardly from a circumferential surface of the wheel center. This annular flange forms with the circumferential surface a pair of shoulders which face laterally of the flange.

In accordance with a preferred method of the invention, the inner annulus of each of the rim halves is brought into abutting relationship with an associated one of the shoulders formed by the annular flange. This abutting relationship is initially created by increasing the temperature of the half-rims relative to the temperature of the wheel center in order to increase the diameter of the inner annuli of the half-rims relative to the circumferential surface of the wheel center. The abutting relationship is maintained by sandwiching the half-rims and wheel center between a pair of sandwich plates and welding the respective half-rims to the annular flange. In a preferred embodiment, this weld is formed as a single bead extending across both shoulders of the annular flange intermediate the rim and continuously around the outwardly facing surface of the drop center.

The resulting wheel is greatly simplified in its method of manufacture and includes far fewer parts than the wheels of the prior art. Since the weld is formed in the drop center of the rim, it is not visible when a tire is mounted on the wheel. Even when a tire is not mounted on the wheel, the weld is invisible in a side view of the wheel.

These and other features and advantages of the invention will become more apparent with a description of preferred embodiments and reference to the associated drawings.

DESCRIPTION OF PREFERRED EMBODIMENTS AND BEST MODE OF THE INVENTION

Figure 1:
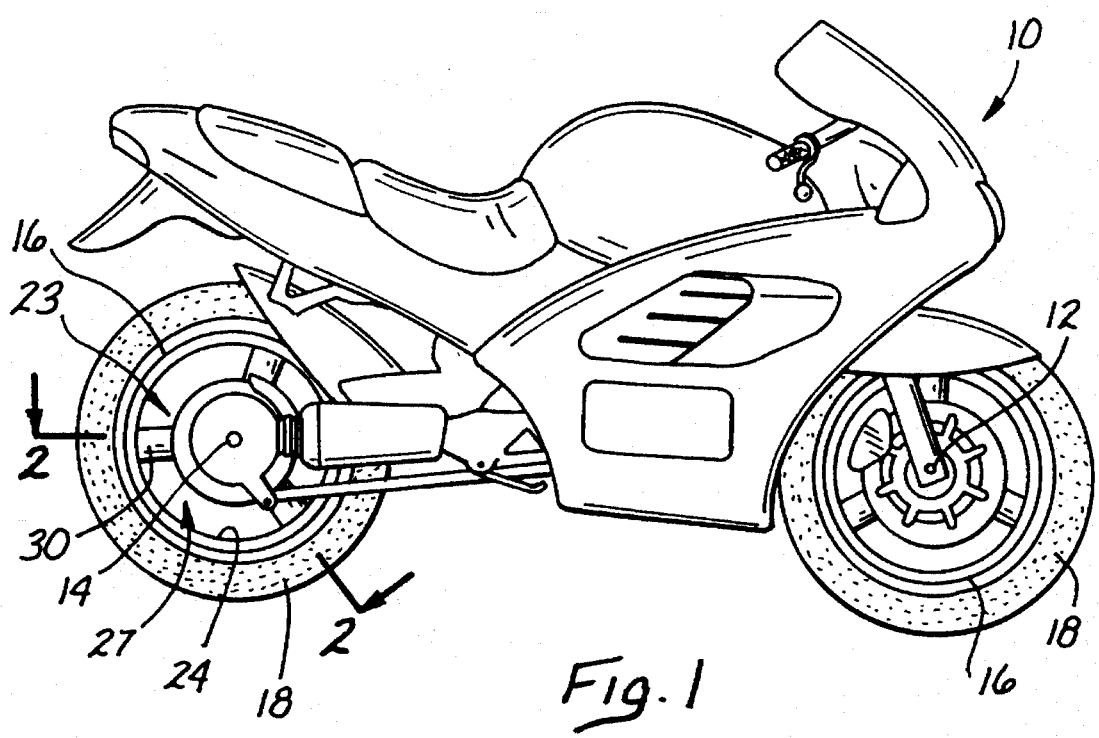
FIG. 1 is a side elevation view of a motorcycle having a pair of axles and a wheel associated with the present invention mounted on each axle.

A motorcycle is illustrated in FIG. 1 and designated generally by the reference numeral 10. The motorcycle includes a front axle 12 and a rear axle 14 each rotatably supporting an associated wheel 16. A tire 18 is mounted on the wheel 16 and provides a suitable coefficient of friction between the motorcycle 10 and the supporting surface. It is the wheel 16 which is of particular interest to the present invention, although the entire motorcycle 10 is shown in order to illustrate that both sides of the wheel 16 are visible.

Figure 2:
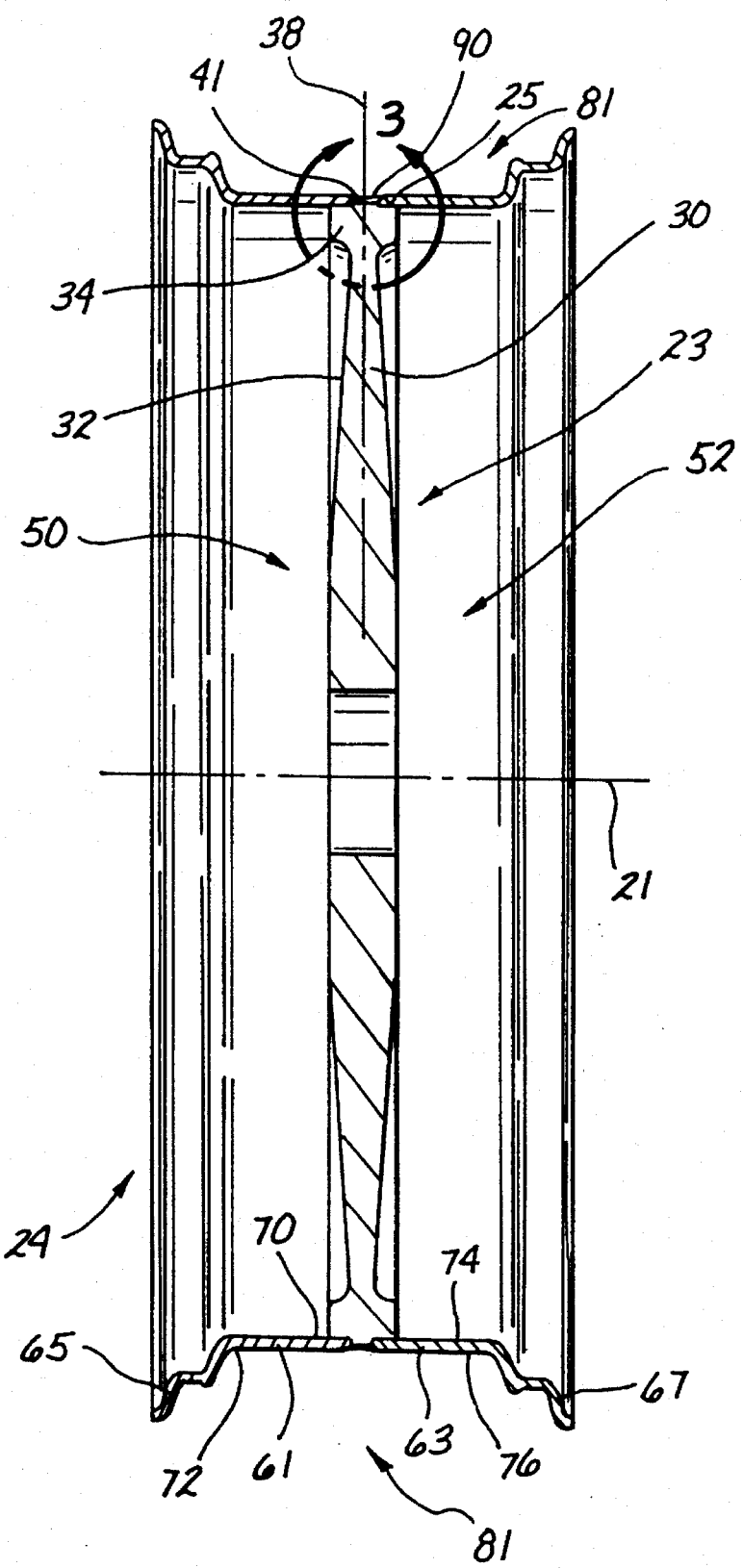
FIG. 2 is an axial cross section view of one embodiment of the wheel of the present invention.

A preferred embodiment of the wheel 16 is illustrated in FIG. 2. This embodiment is generally symmetrical about an axis 21 and includes a wheel center 23 and a rim 24. The wheel center extends outwardly from a hub 26 at the axis 21 to a circumferential surface 25 best shown in the enlarged detail of FIG. 3.

The wheel center 23 can have a wide variety of shapes. In a side view, such as that illustrated in FIG. 1, the wheel center 23 can be fully closed so that it appears as a solid disk extending between the hub 26 and the circumferential surface 25. Alternatively, the wheel center 23 can have portions removed to form windows 27 which are defined by a center structure such as a plurality of spokes 30.

The axial width of the center structure, such as the spokes 30, can also vary as illustrated in FIG. 2. In this embodiment, the spokes 30 have an axial taper 32 which provides a reduced diameter as the spokes 30 extend outwardly from the hub 26. It is desirable if an enlargement 34 is formed at the outer end of the spokes 30. This enlargement 34 provides a heat sink which facilitates welding during the manufacturing process. The enlargement 34 also is desirable in order to provide a substantial area for the circumferential surface 25. In the illustrated embodiment the wheel center 23, in an axial cross section view such as that illustrated in FIG. 2, is disposed along a plane 38 which is perpendicular to the axis 21.

Figure 3:
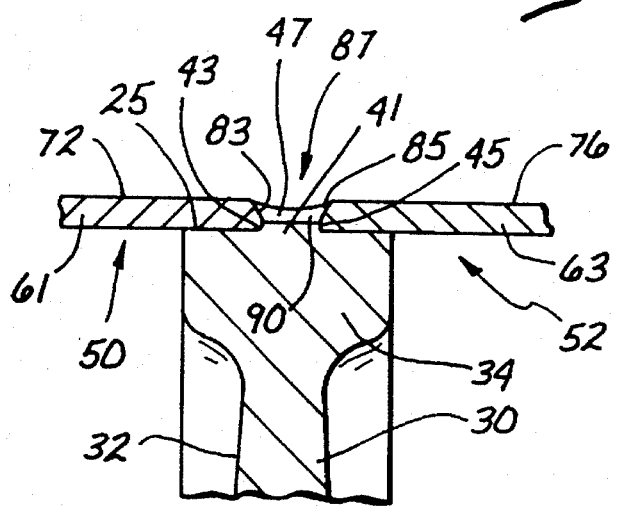
FIG. 3 is an enlarged axial cross section view taken within line 3 of FIG. 2 and illustrating two half-rims joined to a wheel center along a single-bead weld.

Of particular interest to the present invention is an annular flange 41 which extends radially outwardly of the surface 25, as best shown in the detail of FIG. 3. In this case, the annular flange 41 is centered in the plane 38 and extends radially outwardly from the circumferential surface 25 of the enlargement 34. Although not required by the invention, the annular flange 41 in a preferred embodiment extends continuously around the enlargement 34 and has a pair of lateral surfaces which form with the circumferential surface 25 a pair of opposing shoulders 43 and 45. In the illustrated embodiment, an outer cylindrical surface 47 of the flange 41 is concentric with the circumferential surface 25 about the axis 21.

Although the height and width of the annular flange 41 can vary greatly with a particular design, in a preferred embodiment, the shoulders 43 and 45 are separated by an axial width of 0.3 inches. The cylindrical surface 47 is spaced from the circumferential surface 25 by a distance providing the annular flange 41 with a radial height of 0.050 inches.

In the illustrated embodiment, the rim 24 is formed from two half-rims 50 and 52. In this case, the half-rims 50, 52 are identical, each including a respective inner annulus 61, 63 and outer annulus 65, 67. On the half-rim 50, the inner flange 61 and outer flange 65 have an inner surface 70 and an outer surface 72. Similarly, on the half-rim 52, the inner annulus 63 and outer annulus 67 have an inner surface 74 and an outer surface 76. Together, the half-rims 50 and 52 form the rim 24 of the wheel 16 where the outer surfaces 72 and 76 define a drop center 81 of the wheel 16.

It is desirable if the inner annuli 61, 63 of the respective half-rims 50, 52 extend generally parallel to the circumferential surface 25 of the enlargement 34. In a preferred embodiment wherein the circumferential surface 25 is cylindrical, the inner annuli 61 and 63 are also cylindrical and extend axially toward the wheel center 23 terminating at respective end surfaces 83 and 85. Each of these surfaces 83 and 85 in a preferred embodiment is generally perpendicular to the axis 21 for a radial distance equivalent to the height of the annular flange 41, and then extends axially outwardly at an angle such as 45°. Thus, each of the surfaces 83 and 85 can be perpendicular to the axis 21 in proximity to the associated inner surface 70, 74, and can be transverse to the axis 21 in proximity to the associated outer surface 72, 76.

Together the end surfaces 83 and 85 of the half-rims 50, 52 form with the cylindrical surface 47 of the annular flange 41, a circumferential recess 87 which is located intermediate the drop center 81 generally in the plane 38. Within this recess 87, a weld is formed which permanently bonds the half-rims 50 and 52 to the annular flange 87 and the wheel center 23. In the illustrated embodiment, the attachment of each half-rim 50, 52 to the wheel center 23 is accomplished with a single-bead weld 90 which extends continuously around the wheel 16 within the drop center 81.

Figure 6:
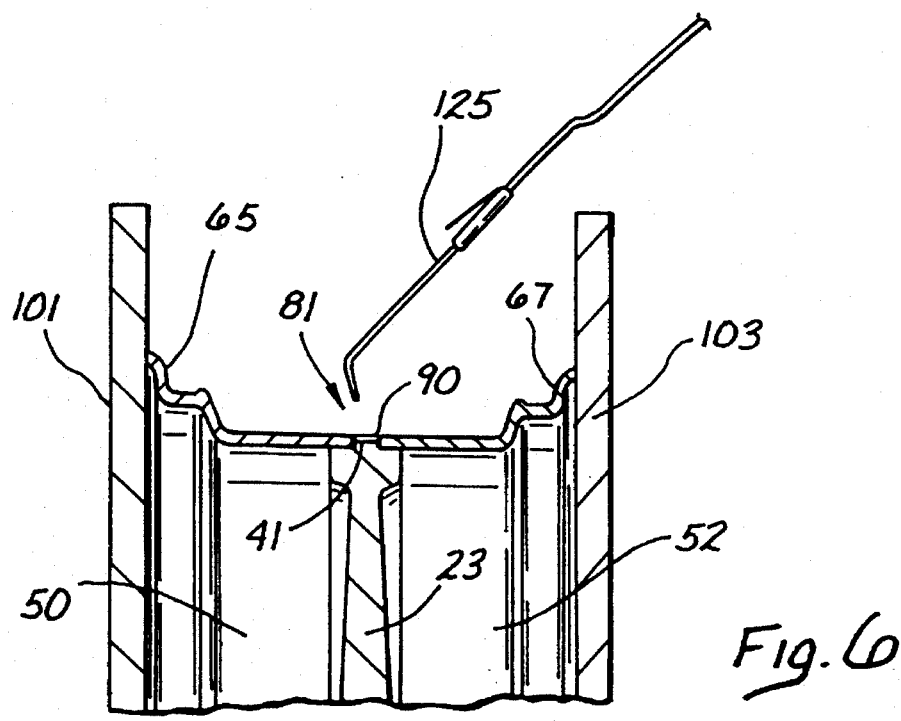
FIG. 6 is an axial cross section view illustrating a step of sandwiching the wheel between the sandwich plates and joining the half-rims to the wheel center along a single continuous circumferential weld.
Figure 4:
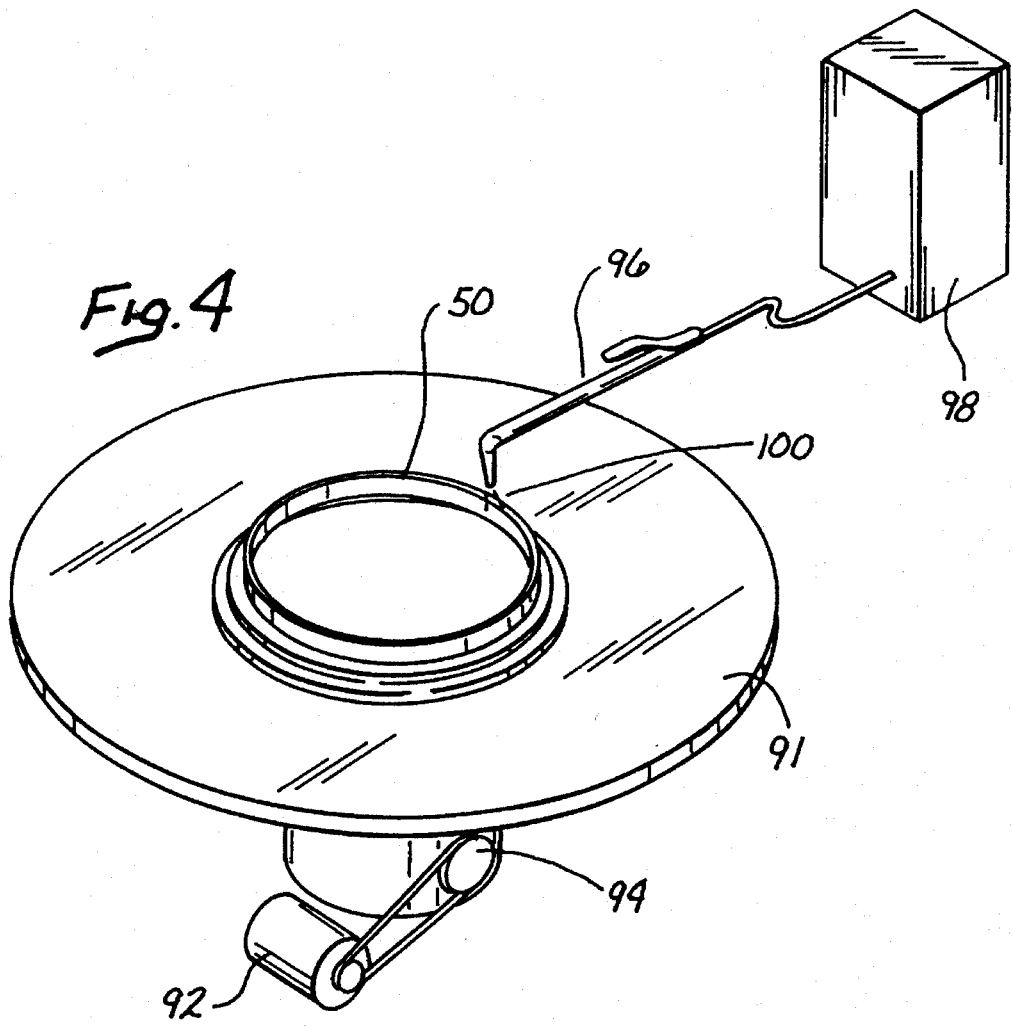
FIG. 4 is a perspective view of one of the half-rims being heated on a rotating table.
Figure 5:
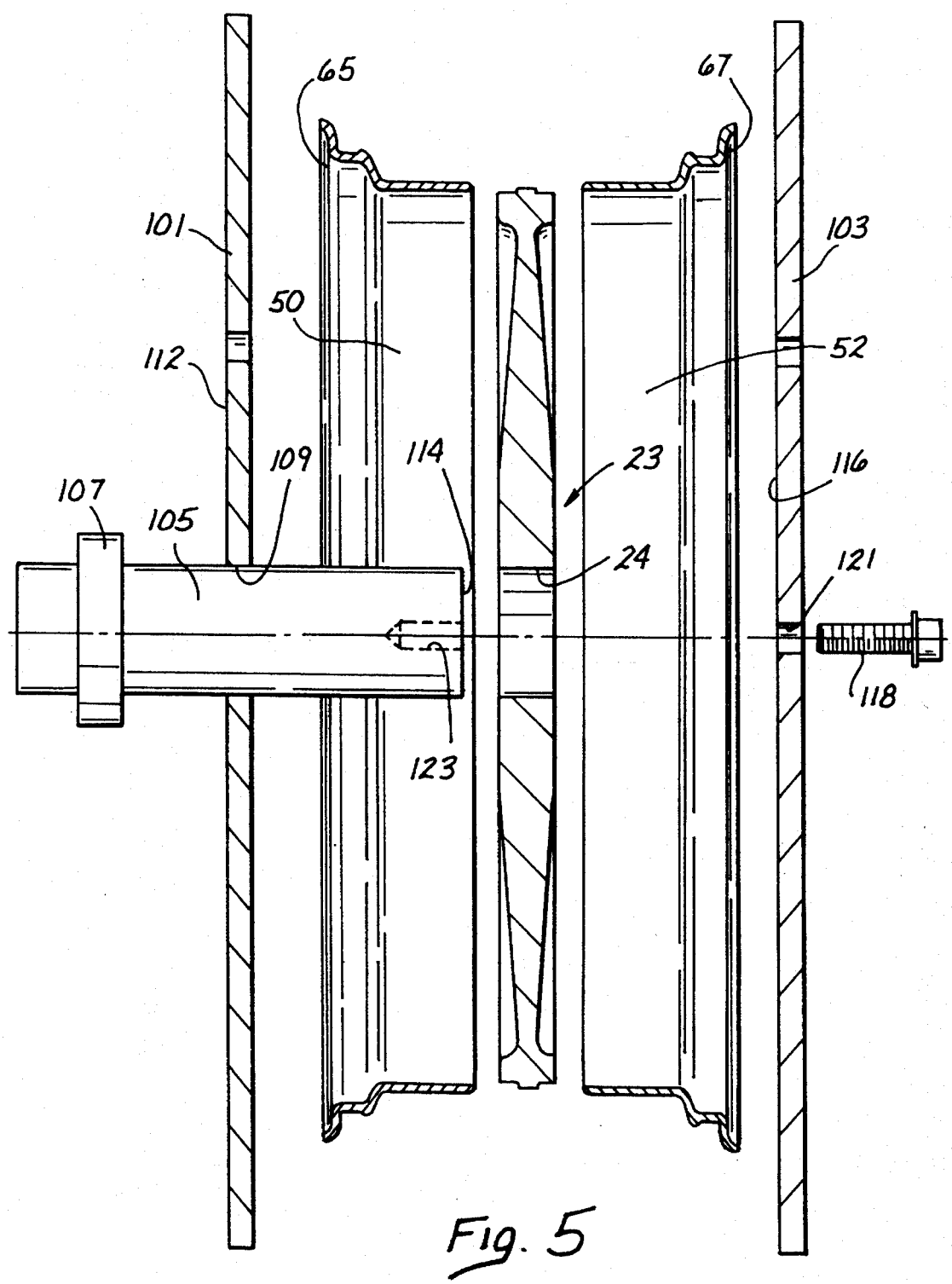
FIG. 5 is an exploded view of the wheel illustrated in FIG. 2 showing a method of manufacture including a step of providing a pair of sandwich plates.

In a preferred method of manufacture illustrated in FIGS. 4, 5 and 6, the half-rims 50, 52 are initially mounted on the wheel center 23. This is accomplished by bringing the inner surfaces 70, 74 of the inner annuli 61, 63 into contact with the circumferential surface 25 of the enlargement 34, and by bringing the end walls 83 and 85 into abutting relationship with the shoulders 43, 45 of the annular flange 41.

In a preferred method, this is a force fit achieved by providing the inner surfaces 70, 74 with a diameter which is slightly less than the diameter of the surface 25. Then, in order to mount the half-rims 50, 52 on the wheel center 23, the inner annuli 61, 63 are expanded relative to the enlargement 34. This expansion can be accomplished by increasing the temperature of the half-rims 50, 52 relative to the wheel center 23. The relative temperature differential can be developed by either cooling the wheel center 23 relative to the half-rims 50, 52, or by heating the half-rims 50, 52 relative to the wheel center 23.

In the method step illustrated in FIG. 4, each of the half-rims 50, 52 are centered on a table 91 which is rotatable by operation of a motor 92 and associated reduction gear box 94. As the table 91 and half-rim 50 are rotated, a torch 96 powered by a gas cylinder 98 heats the half-rim 50 typically with a rosebud flame 100. As the temperature of the half-rim 50 is increased, the inner annuli 61, 63 expand to increase the diameter of the inner surface 70, 74. This permits the half-rim 50 to be mounted over the circumferential surface 25 of the wheel center 23 in abutting relationship with the annular flange 41. Once the half-rims 50, 52 have been operatively disposed on the wheel center 23, they will cool and compress to a force fit relationship with the surface 25.

This preferred disposition between the wheel center 23 and half-rims 50, 52 can be maintained using a pair of sandwich plates 101 and 103 together with an associated arbor 105 having an annular flange 107. In operation, the arbor 105 is inserted through a hole 109 in the sandwich plate 101 and through the hub 26 of the wheel center 23. The annular flange 107 of the arbor 105 engages an outer surface 112 of the sandwich plate 101 while an end surface 114 of the arbor 105 engages an inner surface 116 of the sandwich plate 103. A screw 118 can then be inserted through a hole 121 in the sandwich plate 103 to engage a threaded hole 123 in the arbor 105. Tightening the screw 118 relative to the arbor 105 moves the sandwich plates 101 and 103 toward each other where they engage the outer annuli 65 and 67 of the associated half-rims 50, 52. Tightening the screw 118 maintains the half-rims 50, 52 and wheel center 23 in the operative disposition illustrated in FIG. 6. The weld 90 can then be formed in the recess 81 in a conventional manner using a welder 125.

There are many variations possible within the foregoing apparatus and method associated with the wheel 16. Although the wheel center illustrated in FIG. 2 is symmetrical about both the axis 21 and the plane 38, it will be apparent that this is not required by the invention and variations from this symmetry may be found in other embodiments. It is also possible that in a particular embodiment, the inner annuli 61, 63 of the half-rims 50, 52 may extend at some angle to the axis 21. Even in this case however, it is preferable if the circumferential surface 25 is parallel in cross section to the inner annuli 61, 63. Variations on the design of the wheel center 23 are also possible so that in a side view such as FIG. 1, the appearance of the wheel center 23 can vary greatly.

Given the wide variations possible in different forms of the invention, one is cautioned not to restrict the concept to the embodiments which have been specifically disclosed and illustrated, but rather encouraged to determine the scope of the invention only with reference to the following claims.

I claim:

1. A wheel having an axis and being adapted for rotatably supporting a tire on a vehicle, comprising:

a wheel center extending outwardly of the axis to a circumferential surface;

an annular flange extending radially outwardly from the circumferential surface of the wheel center;

a first rim portion having a first inner annulus;

a second rim portion having a second inner annulus; and a single continuous weld between the first inner annulus of the first rim portion, the second inner annulus of the second rim portion, and the annular flange of the wheel center, for maintaining the first and second rim portions and the wheel center in a fixed relationship.

2. The wheel recited in claim 1 wherein the second rim portion is the same size and shape as the first rim portion.

3. The wheel recited in claim 1 wherein:

in axial cross section the wheel center on at least one side of the axis is generally symmetrical about a particular plane transverse to the axis of the wheel center; and the weld is disposed in the particular plane of the wheel center.

4. The wheel recited in claim 3 wherein the particular plane is generally perpendicular to the axis of the wheel.

5. The wheel recited in claim 1 wherein the annular flange is integral with the wheel center.

6. The wheel recited in claim 1 wherein the wheel rim has an inwardly facing surface and an outwardly facing surface and the weld is disposed on the outwardly facing surface of the wheel rim.

7. A method for manufacturing a wheel, comprising the steps of:

providing a wheel center having an axis and a center structure extending outwardly between the axis and a circumferential surface;

forming an annular flange on the wheel center, the annular flange extending radially outwardly of the circumferential surface of the wheel center and including a first lateral surface and a second lateral surface;

providing a pair of half-rims including a first half-rim having a first inner annulus and a first outer annulus, and a second half-rim having a second inner annulus and a second outer annulus; and attaching the inner annuli of each of the half-rims to the annular flange to form a drop center of the wheel, the attaching step comprising the sub-steps of positioning the first inner annulus of the first half-rim in abutting relationship with the first lateral surface of the annular flange, positioning the second inner annulus of the second half-rim in abutting relationship with the second lateral surface of the annular flange, and forming a single continuous weld between the first inner annulus of the first half-rim, the second inner annulus of the second half-rim, and the annular flange of the wheel.

8. The method recited in claim 7 wherein the step of forming an annular flange includes the step of:

forming the annular flange on the wheel center as an integral part of the wheel center.

9. The method recited in claim 7 wherein the attaching step further comprises the step of:

sandwiching the first half-rim, the wheel center, and the second half-rim between a pair of opposed sandwich plates in order to maintain the abutting relationship between the first inner annulus, the annular flange, and the second inner annulus.

\* \* \* \* \*